United States Patent
Pavlopoulou et al.

(10) Patent No.: US 11,409,745 B2
(45) Date of Patent: Aug. 9, 2022

(54) OPTIMIZING THE EXECUTION ORDER BETWEEN ANALYTICAL FUNCTIONS AND JOINS IN SQL QUERIES

(71) Applicant: Teradata US, Inc, San Diego, CA (US)

(72) Inventors: Christina Pavlopoulou, Riverside, CA (US); Mahbub Hasan, Kenmore, WA (US); B. Anantha Subramanian, Bangalore (IN); Mohammed Al-Kateb, Rancho Palos Verdes, CA (US); Awny Kayed Al-Omari, Cedar Park, TX (US); Kashif Abdullah Siddiqui, Round Rock, TX (US); Robert Matthew Wehrmeister, Austin, TX (US); Mohamed Yassin Eltabakh, Worcestor, MA (US)

(73) Assignee: Teradata US, Inc., San Diego, CA (US)

( * ) Notice: Subject to any disclaimer, the term of this patent is extended or adjusted under 35 U.S.C. 154(b) by 294 days.

(21) Appl. No.: 16/704,934

(22) Filed: Dec. 5, 2019

(65) Prior Publication Data

US 2020/0183935 A1    Jun. 11, 2020

Related U.S. Application Data

(60) Provisional application No. 62/777,308, filed on Dec. 10, 2018.

(51) Int. Cl.
*G06F 16/2453* (2019.01)

(52) U.S. Cl.
CPC .. *G06F 16/24544* (2019.01); *G06F 16/24547* (2019.01)

(58) Field of Classification Search
CPC ................. G06F 16/24544; G06F 16/24547
See application file for complete search history.

(56) References Cited

U.S. PATENT DOCUMENTS

| | | | | |
|---|---|---|---|---|
| 7,620,615 | B1 * | 11/2009 | Milby | G06F 16/24524 |
| 2018/0357279 | A1 * | 12/2018 | Park | G06F 16/3335 |
| 2021/0019315 | A1 * | 1/2021 | Fender | G06F 16/24537 |
| 2021/0124743 | A1 * | 4/2021 | Choi | G06F 16/2246 |

OTHER PUBLICATIONS

WolframMathWorld; "Analytic Function—from Wolfram MathWorld"; https://web.archive.org/web/20181003214205/https://mathworld.wolfram.com/AnalyticFunction.html; Oct. 2, 2018 (Year: 2018).*

* cited by examiner

*Primary Examiner* — Amanda L Willis
(74) *Attorney, Agent, or Firm* — Howard Speight (57) ABSTRACT

Execution of a query invoking an analytical function (AF) is optimized. The query includes a join operation between an AF table and an AuxiliaryTable. A determination is made that the AF includes a plurality of AF properties. Query-level properties about the query are inferred. A determination is made to change an order of the join operation from the plurality of AF properties and query-level properties.

18 Claims, 5 Drawing Sheets

```
CA_USERS(userid, location, ...)
WEB_CLICK(userid, clicktime, page, desc, ...)
```

```
SELECT A.userid, B.sessionid, A.location
FROM CA_USERS as A, (SELECT * FROM SESSIONIZE@coprocessor (
                                    ON (select * from WEB_CLICK
                                    PARTITION BY userid
                                    ORDER BY clicktime
                                    USING TimeColumn ('clicktime')
                                         TimeOut ('60')
                                    )as output
              ) as B
WHERE A.userid = B.userid;
```

QueryProjList: A.userid, B.sessionid, A.location
FProjList: * (columns will be resolved at compile time)
FuncTable: WEB_CLICK
AuxiliaryTable: CA_USERS

FIG. 2A

Join Pushing

```
SELECT B.userid, B.sessionid, B.location
FROM SESSIONIZE@coprocessor (
       ON    (SELECT C.userid, C.clicktime, A.location
              FROM WEB_CLICK C, CA_USERS A
              WHERE C.userid = A.userid
       PARTITION BY userid
       ORDER BY clicktime
       USING
              TimeColumn ('clicktime')
              TimeOut ('60')
       )as B;
```

QueryProjList: B.userid, B.sessionid, B.location
FProjList: B.userid, B.sessionid, B.location
FuncTable: WEB_CLICK
AuxiliaryTable: CA_USERS

FIG. 2B

|  | surplus = "propagatedBack" & projectionContainment = X (Don't Care) | surplus = "ignored" & projectionContainment = "Yes" | |
|---|---|---|---|
|  | rowIndependence="Yes" & partitionIndependence="No" | rowIndependence="No" & partitionIndependence="Yes" | rowIndependence="No" & partitionIndependence="No" |
| uniqueColJoin="Yes" | "Unconditional Join Push"<br>Strategy I<br>① | "Conditional Join Push"<br>Condition: Join is on the partitioning column(s)<br>Strategy I<br>② | "Not applicable re-write"<br>③ |
| uniqueColJoin="No" | "Unconditional Join Push"<br>Strategy I<br>④ | "Not applicable re-write"<br>⑤ | "Not applicable re-write"<br>⑥ |

FIG. 3

|  | rowIndependence="Yes" & partitionIndependence="No" | rowIndependence="No" & partitionIndependence="Yes" | rowIndependence="No" & partitionIndependence="No" |
|---|---|---|---|
| uniqueColJoin="Yes" | *"Unconditional Join Push"*<br><br>Strategy III<br><br>① | *"Conditional Join Push"*<br><br>Condition: Join is on the partitioning column(s)<br><br>Strategy II<br><br>② | *"Not applicable re-write"*<br><br>③ |
| uniqueColJoin="No" | *"Not applicable re-write"*<br><br>④ | *"Not applicable re-write"*<br><br>⑤ | *"Not applicable re-write"*<br><br>⑥ | surplus = "ignored" & projectionContainment = "No"

OPTIMIZING THE EXECUTION ORDER BETWEEN ANALYTICAL FUNCTIONS AND JOINS IN SQL QUERIES

CROSS-REFERENCE TO RELATED APPLICATIONS

This application claims the benefit of U.S. Provisional Patent Application No. 62/777,308, entitled "Optimized Analytics at Scale: Optimizing the Execution Order between Analytical Functions and Joins in SQL Queries," filed on Dec. 18, 2018, which is incorporated by reference in its entirety.

BACKGROUND

Integrating analytical functions (AFs) within Structured Query Language (SQL) queries is becoming the norm of most emerging applications. Such integration poses new challenges to the query optimizer because these AFs are typically black boxes with no known costs or characteristics, and hence many optimization and transformation rules cannot kick in. The roots of this problem represent a classical challenge to the database systems because the same challenges apply to the user-defined-functions (UDFs) in general. However, the problem is becoming more intense and profound because: (1) current AFs are far more complex and expensive than classical UDFs, (2) many AFs are now expressed as table functions (or table operators) that can appear in the FROM clause and get involved in complex join operations, and (3) unlike the standard in database (in-DB) UDFs, many AFs are now provided by external engines, e.g., ASTER®, where the ASTER trademark is owned by Teradata US, Inc., TENSORFLOW®, where the TENSORFLOW trademark is owned by Google LLC, and SPARK™, where the SPARK trademark is owned by the Apache Software Foundation, and hence their execution involves high data transfer and network overheads.

Optimizing the execution order between AFs and joins in SQL queries is a challenge.

SUMMARY

In one aspect, a method for optimizing execution of a query invoking an analytical function (AF), wherein the query includes a join operation between an AF table and an AuxiliaryTable, includes determining that the AF includes a plurality of AF properties. The method includes inferring query-level properties about the query. The method includes determining from the plurality of AF properties and query-level properties to change an order of the join operation.

Implementations may include one or more of the following. Changing the order of the join operation may include removing a join with the AuxiliaryTable from the query, joining the AuxiliaryTable with the AF table inside an ON clause of the AF, moving the join operation along with any other condition on AuxiliaryTable to a join within the AF, and adjusting a list of columns projected from the AF to include any columns from the AuxiliaryTable that are required for a list of columns projected from the query. Changing the order of the join operation may include keeping a join with the AuxiliaryTable as is in the query, joining the AuxiliaryTable with the AF table inside the ON clause of the AF, and copying the join condition along with any other condition on the AuxiliaryTable to the join within the AF. The AF properties may include "surplus", which specifies whether the AF can accept additional columns beyond columns specified in an AF input table (FuncTable) and a behavior of the AF over any accepted additional columns, "rowIndependence", which specifies whether the AF operates on each row independent of the others, and, for a single input row, that the AF produces zero output rows or one or more rows having the same values as a subset of the input row values, and/or "partitionIndependence", which specifies whether the AF operates on each partition independent of the others, and, for a single input partition, that the AF produces zero output rows or one or more rows having the same values as rows in a subset of the partitioning columns values of the input partition. The query-level properties may include "uniqueColJoin", which specifies whether the join operation between the AF table and the Auxiliary table involves a unique column in the Auxiliary table, and/or "projectionContainment", which specifies whether a projection list for the query (QProjList) is contained in a projection list for the AF (FprojList). Determining that the plurality of AF properties includes a plurality of AF properties may include determining that the AF will accept more columns in addition beyond columns specified in an AF input table and that those columns will be returned from the AF, and the AF operates on each record independently of any other record. Inferring query-level properties about the query may include determining that the join operation between the AF table and the AuxiliaryTable involves a unique column. Determining that the plurality of AF properties includes a plurality of AF properties may include determining that the AF will accept more columns in addition beyond columns specified in an AF input table and that those columns will be returned from the AF, and the AF operates on each partition of a plurality of partitions independently of any other partition in the plurality of partitions. Inferring query-level properties about the query may include determining that the join operation between the AF table and the AuxiliaryTable involves a unique column and that the unique column is a partitioning column. Determining that the plurality of AF properties includes a plurality of AF properties may include determining that the AF will accept more columns in addition beyond columns specified in an AF input table and that those columns will be returned from the AF, and the AF operates on each record independently of any other record. Inferring query-level properties about the query may include determining that the join operation between the AF table and the AuxiliaryTable does not involve a unique column. Determining that the plurality of AF properties includes a plurality of AF properties may include determining that the AF will ignore columns beyond columns specified in an AF input table, and the AF operates on each record independently of any other record. Inferring query-level properties about the query may include determining that the query projects some columns from the AuxiliaryTable column. Determining that the plurality of AF properties includes a plurality of AF properties may include determining that the AF will ignore any columns in addition beyond columns specified in an AF input table, and the AF operates on each partition of a plurality of partitions independently of any other partition in the plurality of partitions. Inferring query-level properties about the query may include determining that the join operation between the AF table and the AuxiliaryTable involves a unique column and that the unique column is a partitioning column.

In one aspect, a non-transitory computer-readable tangible medium, on which is recorded a computer program, the computer program comprising executable instructions, that, when executed, performs a method including determining that the AF includes a plurality of AF properties. The method includes inferring query-level properties about the query. The method includes determining from the plurality of AF properties and query-level properties to change an order of the join operation.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

This disclosure describes techniques for optimizing the execution order between joins and AFs. A metadata-driven approach for capturing important AF properties that the query optimizer can leverage to push (or pull) joins around the AFs is proposed. Various scenarios under which the query re-writing is permissible are described. Different re-write strategies to handle different scenarios are described. The proposed class of optimizations can have a significant impact on both the queries' performance and the systems' resources, e.g., network and spool utilizations.

Figure 1A:
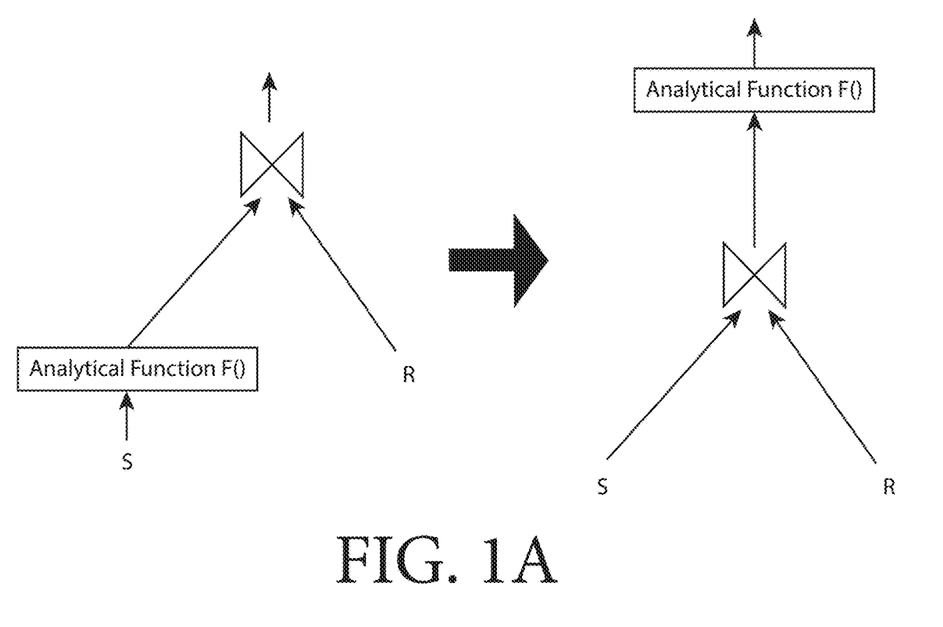
FIG. 1A is a chart illustrating join pushing.
Figure 1B:
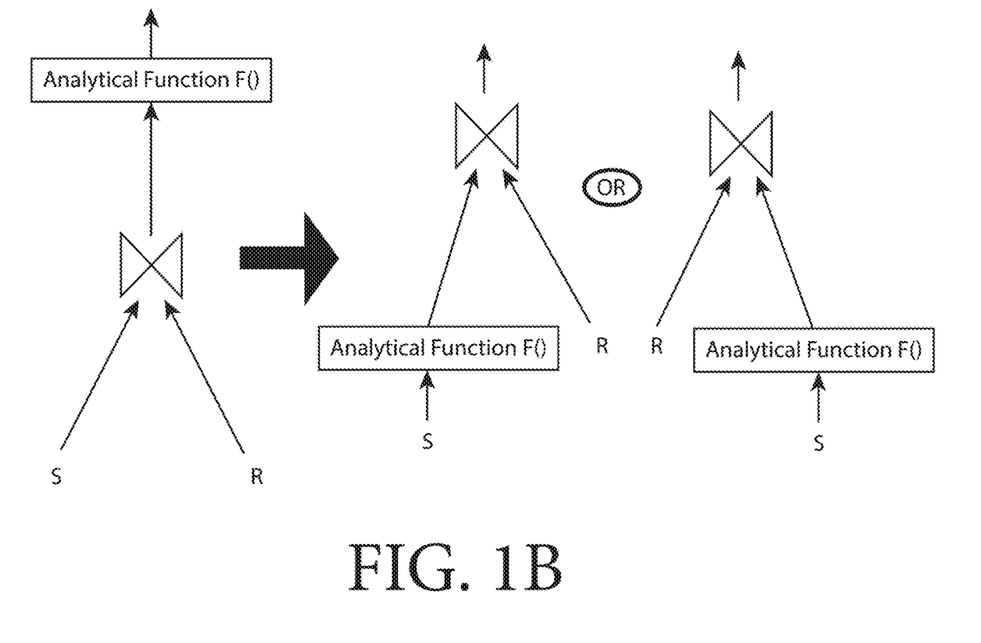
FIG. 1B is a chart illustrating join pulling.

FIGS. 1A and 1B illustrate the main idea. FIG. 1A shows the possibility of applying "join pushing", i.e., pushing the execution of the join operator to take place before the execution of the AF. Join pushing can be beneficial in the cases where the join operation is selective. This would mean less records are passed to the AF, less data transfer, less spools and intermediate files, and faster execution of the AF. The reverse optimization is also possible as illustrated in FIG. 1B, namely "join pulling", i.e., pulling the execution of the join operator to take place after the execution of the AF. Performing these re-writes relies on the properties of both the AF and the join operation to increase the likelihood that the generated plans are equivalent and would generate the same results. In this disclosure, a minimal set of properties that help in performing such optimizations is identified. Note that "S" and "R" in FIGS. 1A and 1B refer respectively to the FuncTable and the AuxiliaryTable discussed below.

Join pushing is a well-known optimization technique used in many cases to benefit performance. For example, join pushing has been used to push join into views which have been created by UNION ALL operator. There is also some work in literature focusing on pushing joins before or after the GROUP BY operator according to cost models (memSQL). There are other optimizations that focus on optimizing black box functions within SQL queries. Most of this work addresses building profiles and cost models to better estimate the AF's cost given a specific input. Other work addresses the well-known predicate push optimization in the cases where the predicate involves AFs. In these situations, the predicate evaluation can be expensive and it may not be cost effective to push the predicate down in the query plan through other operators like joins. However, there is no previous work that addresses the execution order between joins and AFs.

An example of the optimizations enabled by the technique is now provided, along with an introduction to some terminology and a presentation of key properties.

Example 1

Figure 2A:
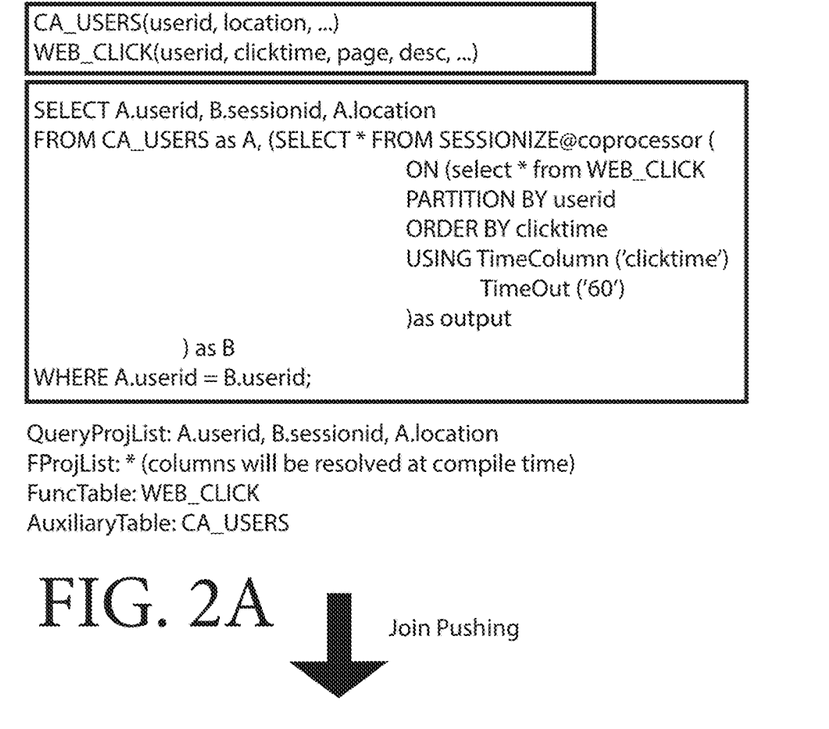
FIG. 2A is a listing of a query before a join is pushed.

Assume the query presented in FIG. 2A, which involves an invocation for the AF Sessionize( ) on the WEB_CLICK table. The AF's output joins with table CA_USERS. Assume WEB_CLICK has $10^9$ different users world-wide, whereas CA_USERS only has $10^6$ different users. Therefore, the output from the AF will ultimately be filtered out by the join operation to keep only the records related to users in CA_USERS. If join pushing is possible, which is the case for the Sessionize( ) AF, then the query can be re-written as in FIG. 2B. The join would reduce the number of input records to be sent to the AF by a factor of $10^3$.

Some basic terminology used in this disclosure include (refer to FIGS. 2A and 2B for examples):

QueryProjectionList (QProjList): The list of columns projected in the outer query.

FuncProjectionList (FProjList): The list of columns projected from the AF, i.e., the output schema of the AF.

FuncTable: The input relation (which may be a base relation or a relation derived from any arbitrary SQL query) from which the AF retrieves its required (mandatory) input columns. These columns are typically defined in the USING clause within the AF invocation. The FuncTable is the "S" in FIGS. 1A and 1B.

AuxiliaryTable: The other relation (which may be a base relation or a relation derived from any arbitrary SQL query) involved in the join operation, i.e., the one that can be pushed inside or pulled outside the AF invocation. The AuxiliaryTable is the "R" in FIGS. 1A and 1B.

Properties for the AF, shown below and provided by the AF's developer, enable the proposed optimizations:

"surplus": "notAllowed"|"ignored"|"propagatedBack"

"rowindependence": "Yes"|"No"

"partitionindependence": "Yes"|"No"

The semantics of these properties are shown in Table 1 below. Note that these properties may be a subset of the metadata information that form a "function descriptor," described in co-pending U.S. patent application Ser. No. 16/704,802, filed on Dec. 5, 2019, entitled "Enabling Cross-Platform Query Optimization via Expressive Markup Language," incorporated by reference.

TABLE 1

| Property Name | Value Type | Value Domain | Description |
|---|---|---|---|
| "surplus" | String | The value must be one of: "notAllowed", "ignored", "propagatedBack" | This property specifies whether or not the AF can accept additional columns beyond the required ones (called "surplus") and specifies the behavior of the AF over these additional columns. This behavior affects the types of optimizations that can be applied. "notAllowed": Indicates that the AF does not accept any additional columns beyond those needed by the AF. If additional columns are sent, the execution fails. "ignored": Indicates that the AF accepts additional columns (beyond the required ones). These additional columns are ignored (dropped) by the AF, and they never appear in the output. "propagatedBack": Indicates that the AF accepts additional columns (beyond the required ones). These additional columns are ignored (skipped) during the evaluation, but they are returned back along with the results, e.g., "pass though" columns. |
| "rowIndependence" | String | The value must be one of the following: "Yes", "No" | This property is set to "Yes" if-and-only-if (iff) the AF satisfies the following two conditions: 1. The AF operates on each row independent of the others 2. For a single input row, the AF may produce: zero output rows, or one or more rows all as the input row values (or subset of its fields) plus possibly additional columns. If this property is set to "Yes", then a post-AF predicate on any of the input columns, that passes through to the output, can be pushed as a pre-AF predicate and gets evaluated on the AF's input. |
| "partitionIndependence" | String | The value must be one of the following: "Yes", "No" | This property is set to "Yes" iff the AF satisfies the following two conditions: 1. The AF operates on each partition independent of the others. 2. For a single input partition, the AF may produce: zero output rows, or one or more rows all having the same values in the |

TABLE 1-continued

| Property Name | Value Type | Value Domain | Description |
|---|---|---|---|
| | | | partitioning columns as those of the input partition (or subset of its fields) plus possibly additional columns If this property is set to "Yes", then a post-AF predicate on any of the "partition by" columns, that pass through to the output, can be pushed as a pre-AF predicate and gets evaluated on the AF's input. Constraint: "partitionIndependence" is applicable only to AFs whose base input is partitioned, i.e., has PARTITION BY clause). |

The optimization techniques described in this disclosure are not applicable when the rowIndependence and partitionIndependence properties are both "Yes".

At the query level, some additional properties, shown below, may be inferred to help check the validity of the proposed optimizations. These properties are inferred at query time from the database dictionary tables and the query itself. The properties include:

"uniqueColJoin": "Yes" | "No"
"ProjectionContainment": "Yes" | "No"

The semantics of these properties are defined in Table 2.

TABLE 2

| Property Name | Value Type | Value Domain | Description |
|---|---|---|---|
| "uniqueColJoin" | String | The value must be one of the following: "Yes", "No" | This property specifies whether the join condition between the FuncTable and AuxiliaryTable involve a unique column in the AuxiliaryTable. The value is "Yes" if that is the case, otherwise "No". Note that the uniqueness of the join column can be either "static", i.e., inherent in the column values, or "dynamic", i.e., the column is made unique (fabricated) through other query re-write rules. |
| "projectionContainment" | String | The value must be one of the following: "Yes", "No" | This property specifies whether the outer projection list (QProjList) is contained in the AF's projection list (FprojList). In other words, the query is not projecting columns from the AuxiliaryTable. The property is set to "Yes" if (QprojList ⊆ FprojList), otherwise "No". |

Figure 3:
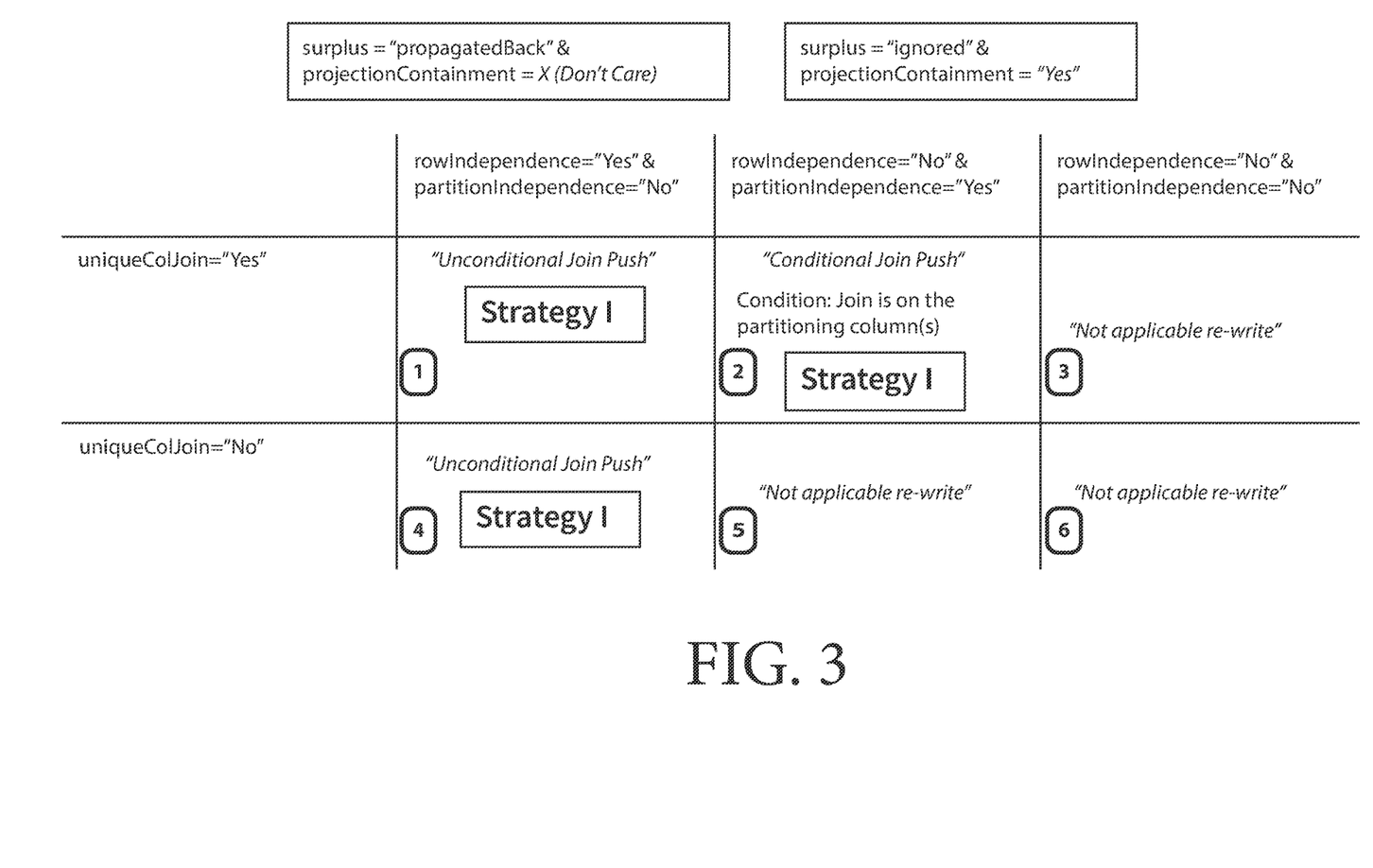
FIG. 3 is a chart showing combinations of AF properties and query properties that allow join pushing to occur.
Figure 4:
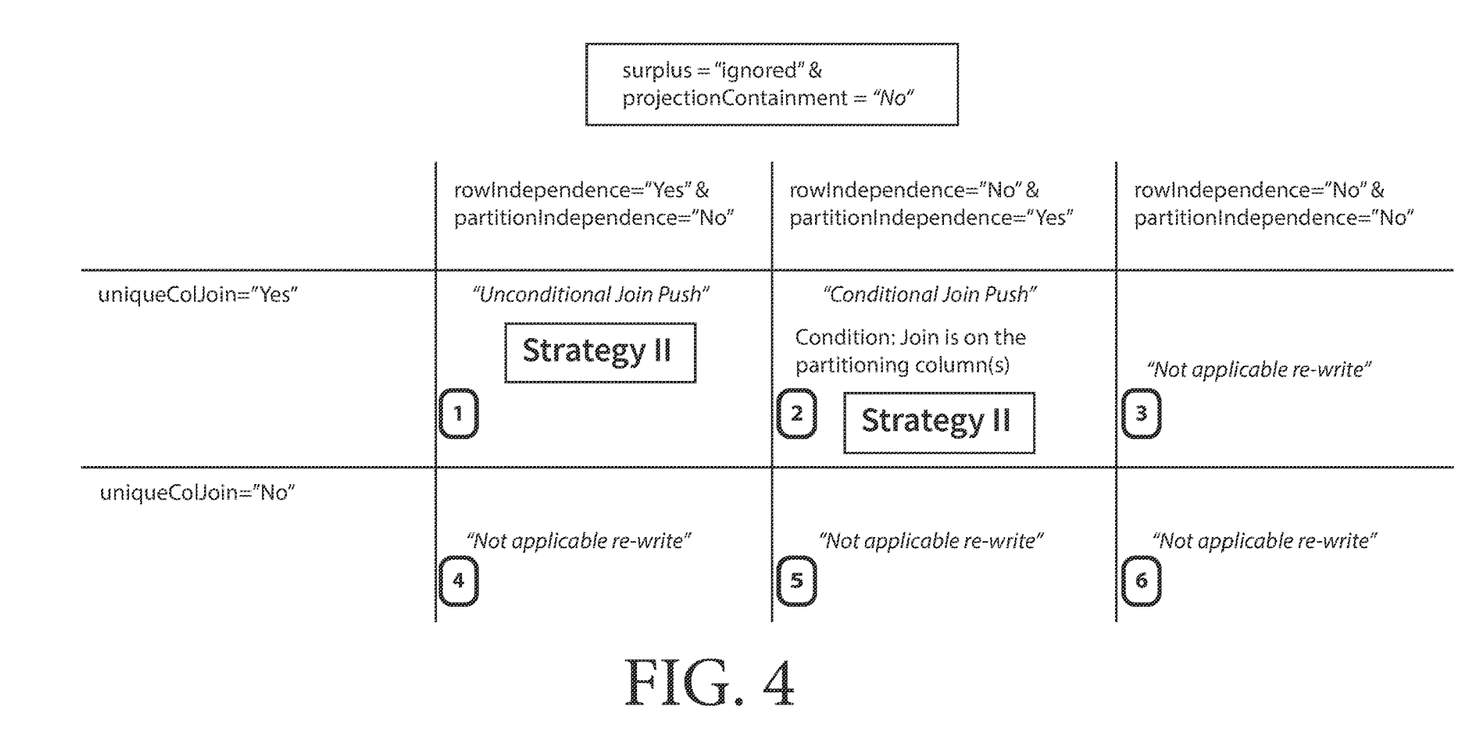
FIG. 4 is a chart showing combinations of AF properties and query properties that allow join pushing to occur.

For the join push optimization, i.e., pushing a join operation from outside of the AF to be inside the AF, FIGS. 3 and 4 show summaries of the different combinations of the aforementioned properties, and the combinations of such properties under which a join push re-write is possible. The combinations are labeled with sequential numbers for ease of reference.

FIG. 3 covers the combination scenarios where {surplus="propagatedBack"} or {surplus="ignored" & projectionContainment="Yes"}. In the following, the rationale behind the different combinations is provided.

FIG. 3—Combination 1: In this combination, assume surplus="propagatedBack", in which case more columns can be passed to the AF (e.g., any columns from AuxiliaryTable that the outer query needs) and these columns will be returned back. The two tables are joining based on a unique column, which means that the join may only drop records from FuncTable but no records can be replicated or added. rowIndependence="Yes" means that the AF operates on each record independently of any other record. Hence, dropping some records will not affect the output of the remaining ones. In this case, the values of projectionContainment are "don't care" (indicated as X). And in this case, the join push is unconditionally applicable and the rewrite can be performed according to Strategy I described below (simply pushing the join inside the AF, and passing any columns that the outer query needs from AuxiliaryTable as pass-through columns to the AF).

FIG. 3—Combination 2: Combination 2 is different from Combination 1 in that the AF does not operate at the record level, but at the partition level, i.e., it partitions the data and processes each partition. The partitionIndependence="Yes" indicates that the processing of each partition is independent of the others, and hence some partitions can be dropped safely. In this case, the only condition for the join push re-write to be applicable is that the join must be on the partitioning columns (or a subset of such columns). This is the case in FIGS. 2A and 2B.

FIG. 3—Combination 3: In this combination, the AF processes the records (or partitions) with some unknown dependency between them, and hence dropping any records (or partitions) due to a join pushing may result in a different output. Therefore, the re-write is not applicable for Combination 3.

FIG. 3—Combination 4: This combination is different from Combination 1 in that the join column is not unique, and hence the join may result in repeating the non-dropped records from FuncTable. However, since the AF has rowIndependence="Yes", each record is processed independently from the other records including the replicas (if any). Since the replicas would have been generated even if the join is not pushed (because the join in the outer block will generate them anyway), then the re-write is applicable and will generate the same answer.

FIG. 3—Combinations 5, and 6: In these two combinations the re-write is not applicable. For Combination 5, there can be dependencies between the records within one partition. And in Combination 6, there can be any type of dependencies between any set of records. Therefore, introducing any replication may change the AF's output.

Still referring to FIG. 3, but now assume that surplus="ignored", which means the AF may accept additional columns (beyond the required ones) but will not return them back to the called query. In this case, if the outer query is not projecting any columns from AuxiliaryTable, i.e., projectionContainment="Yes", then there is no need to pass any additional columns to the AF in the first place. Therefore, all the re-write applicability scenarios highlighted in FIG. 3 still apply for the combination of {surplus="ignored" & projectionContainment="Yes"}.

The re-write steps in Strategy I include (refer to FIGS. 2A and 2B for an example):
1. Removing the join with table AuxiliaryTable from the query
2. Joining AuxiliaryTable with FuncTable inside the ON clause of the analytical function
3. Moving the join condition along with any other condition on AuxiliaryTable to the join within the derived table context that provides the input to the AF
4. Adjusting FProjList by adding any columns from AuxiliaryTable that are needed in QProjList FIG. 4 covers the rest of the combination scenarios where {surplus="ignored" & projectionContainment="No"}. The rationale behind the different combinations is provided below.

FIG. 4—Combination 1: In this combination, uniqueColJoin="Yes", which means that pushing the join inside the AF may effectively reduce the number of records that pass to the AF as input. However, the challenge is that projectionContainment="No", which means the outer query is projecting some columns from AuxiliaryTable. And since surplus="ignored", if the join is pushed inside the AF, these needed columns cannot pass through the AF to the outer query. Therefore, the join push re-write is still applicable and can be beneficial. But, the join in the outermost block is evaluated and since this join involves unique columns from the Auxiliary Table, this join does not produce additional rows. Since the join is on a unique column, no extra duplicates will be generated. In summary, the join can be pushed to help reduce the AF's input size, and at the same time, the join in the outer block is kept for the outer query to project its needed columns. This is referred to as Re-Write Strategy II in FIG. 4.

FIG. 4—Combination 2: Following the same rationale as in Combination 2 in FIG. 3, Strategy II is applicable only if the join involves the AF's partitioning columns (or a subset of them). This is because the AF has partitionIndependence="Yes".

FIG. 4—Combination 3: Following the same rationale as in Combination 3 in FIG. 5, join pushing is not applicable because the AF has possible unknown dependency among its input records.

FIG. 4—Combinations 4, 5, and 6: Similar to Combinations 1, 2 and 3, if the join push re-write were done, the join in the outer block would be kept as well (to project the needed columns from Auxiliary Table). However, since in Combinations 4, 5, and 6, the uniqueColJoin="No", any replications of the records will be introduced twice; once because of joining inside the AF, and once because of joining outside the AF, which may change the final results of the query.

The re-write steps in Strategy II include (refer to FIG. 2 for an example):
1. Keeping the join in the outer block with table AuxiliaryTable as is in the query,
2. Joining AuxiliaryTable with FuncTable inside the ON clause of the AF, and
3. Copying the join condition along with any other condition on AuxiliaryTable to the join within the AF Join pulling, which is the reverse of join pushing, relies on the same set of function-level and query-level properties. The rationale used for the different combinations of join pushing also applies to the join pulling re-writes and is not repeated.

Figure 2B:
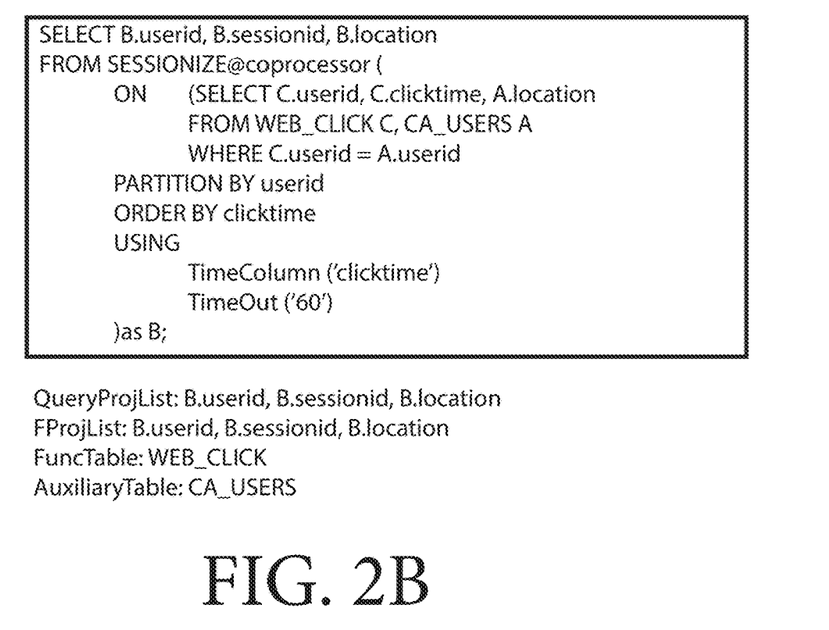
FIG. 2B is a listing of the query of FIG. 2A after the query is rewritten to push the join.
Figure 5:
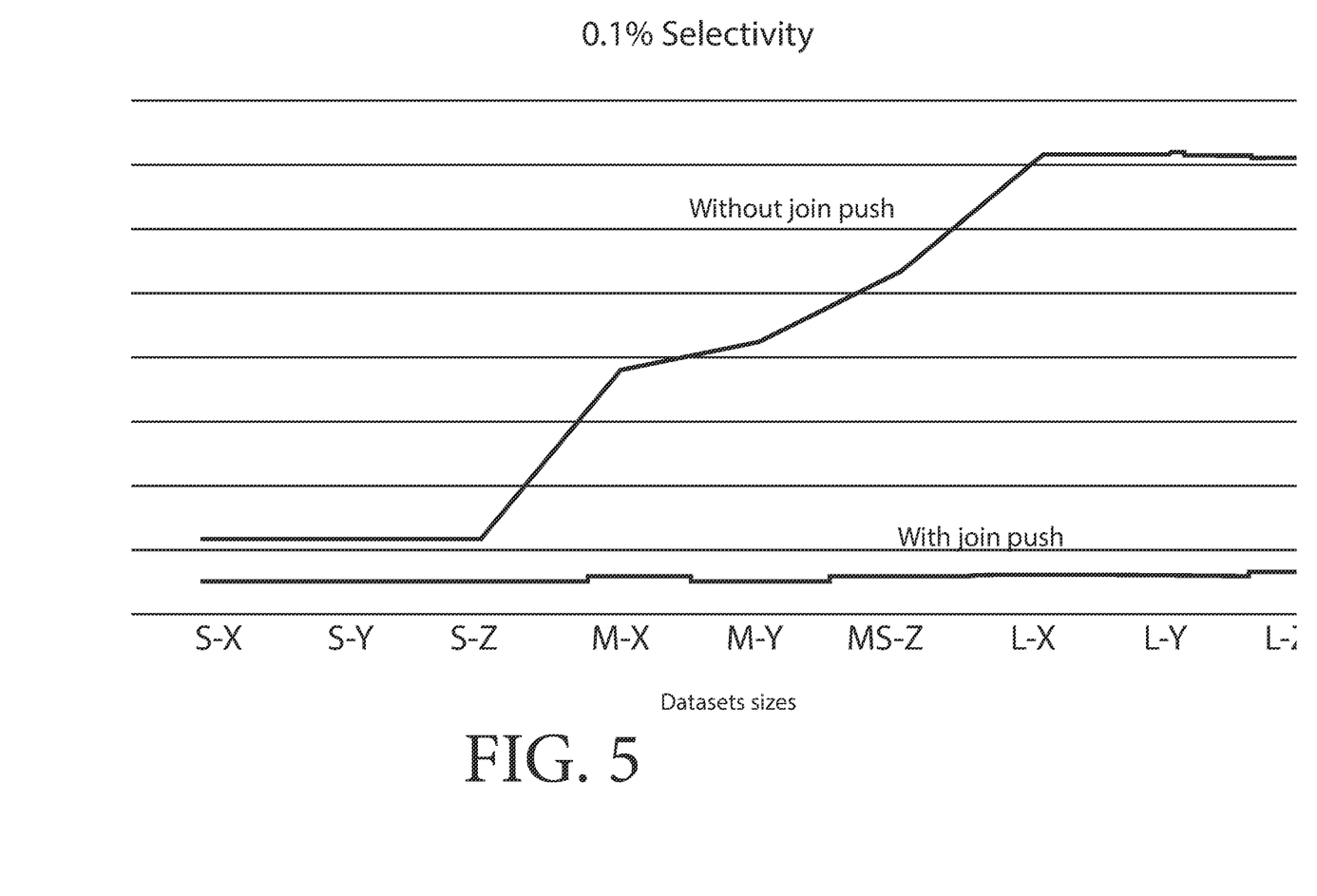
FIG. 5 illustrates performance of the query of FIGS. 2A and 2B.

The performance of the query presented in FIGS. 2A and 2B is evaluated with and without the join push rewrite as shown in FIG. 5. In the experiment, the AF's table (WEB_CLICKS) has three different dataset sizes ($S=10^6$, $M=5 \times 10^6$, $L=10^7$). For each of these sizes, the auxiliary table (CA_USERS) is populated with three different dataset sizes ($X=10^3$, $Y=10^4$, $Z=5 \times 10^4$). The selectivity of web_clicks is kept the same (0.1%) for all the different combinations in our configurations. The results of the evaluation are depicted in FIG. 5.

In this experimental evaluation, as can be seen in FIG. 5 the optimization improves the query execution time by up to 14 times. As the size of the AF's table (which is the original AF input) increases, the benefit from the join push rewrite is more significant. This happens because the selectivity remains the same, thus the larger the AF's table is, the biggest is its pruning after the join with the auxiliary table. Consequently, after the join, the input to the AF is much smaller than the original one. Hence, the total performance of the query is significantly improved.

Further examples consistent with the present teaching are set out in the following numbered clauses.

Clause 1. A method for optimizing execution of a query invoking an analytical function (AF), wherein the query includes a join operation between an AF table and an AuxiliaryTable, the method comprising:

determining that the AF includes a plurality of AF properties, inferring query-level properties about the query;

determining from the plurality of AF properties and query-level properties to change an order of the join operation.

Clause 2. The method of clause 1 wherein changing the order of the join operation comprises:

removing a join with the AuxiliaryTable from the query;

joining the AuxiliaryTable with the AF table inside an ON clause of the AF;

moving the join operation along with any other condition on AuxiliaryTable to a join within the AF; and adjusting a list of columns projected from the AF to include any columns from the AuxiliaryTable that are required for a list of columns projected from the query.

Clause 3. The method of any preceding clause wherein changing the order of the join operation comprises;

keeping a join with the AuxiliaryTable as is in the query, joining the AuxiliaryTable with the AF table inside the ON clause of the AF, and copying the join condition along with any other condition on the AuxiliaryTable to the join within the AF.

Clause 4. The method of any preceding clause wherein the AF properties comprise:

"surplus", which specifies whether the AF can accept additional columns beyond columns specified in an AF input table (FuncTable) and a behavior of the AF over any accepted additional columns, "rowIndependence", which specifies whether the AF operates on each row independent of the others, and, for a single input row, that the AF produces zero output rows or one or more rows having the same values as a subset of the input row values, and "partitionIndependence", which specifies whether the AF operates on each partition independent of the others, and, for a single input partition, that the AF produces zero output rows or one or more rows having the same values as rows in a subset of the partitioning columns values of the input partition.

Clause 5. The method of any preceding clause wherein the query-level properties comprise:

"uniqueColJoin", which specifies whether the join operation between the AF table and the Auxiliary table involves a unique column in the Auxiliary table, and "projectionContainment", which specifies whether a projection list for the query (QProjList) is contained in a projection list for the AF (FprojList).

Clause 6. The method of any preceding clause wherein:

determining that the plurality of AF properties includes a plurality of AF properties includes determining that:

the AF will accept more columns in addition beyond columns specified in an AF input table and that those columns will be returned from the AF, and the AF operates on each record independently of any other record, inferring query-level properties about the query includes:

determining that the join operation between the AF table and the AuxiliaryTable involves a unique column.

Clause 7. The method of any preceding clause wherein:

determining that the plurality of AF properties includes a plurality of AF properties includes determining that:

the AF will accept more columns in addition beyond columns specified in an AF input table and that those columns will be returned from the AF, and the AF operates on each partition of a plurality of partitions independently of any other partition in the plurality of partitions, inferring query-level properties about the query includes:

determining that the join operation between the AF table and the AuxiliaryTable involves a unique column and that the unique column is a partitioning column.

Clause 8. The method of any preceding clause wherein:

determining that the plurality of AF properties includes a plurality of AF properties includes determining that:

the AF will accept more columns in addition beyond columns specified in an AF input table and that those columns will be returned from the AF, and the AF operates on each record independently of any other record, inferring query-level properties about the query includes:

determining that the join operation between the AF table and the AuxiliaryTable does not involve a unique column.

Clause 9. The method of any preceding clause wherein:

determining that the plurality of AF properties includes a plurality of AF properties includes determining that:

the AF will ignore columns beyond columns specified in an AF input table, the AF operates on each record independently of any other record, inferring query-level properties about the query includes:

determining that the query projects some columns from the AuxiliaryTable column.

Clause 10. The method of any preceding clause wherein:

determining that the plurality of AF properties includes a plurality of AF properties includes determining that:

the AF will ignore any columns in addition beyond columns specified in an AF input table, and the AF operates on each partition of a plurality of partitions independently of any other partition in the plurality of partitions, inferring query-level properties about the query includes:

determining that the join operation between the AF table and the AuxiliaryTable involves a unique column and that the unique column is a partitioning column.

Clause 11. A non-transitory computer-readable tangible medium, on which is recorded a computer program, the computer program comprising executable instructions, that, when executed, perform a method comprising:

determining that the AF includes a plurality of AF properties, inferring query-level properties about the query;

determining from the plurality of AF properties and query-level properties to change an order of the join operation.

Clause 12. The computer program of clause 11 wherein changing the order of the join operation comprises:

removing a join with the AuxiliaryTable from the query;

joining the AuxiliaryTable with the AF table inside an ON clause of the AF;

moving the join operation along with any other condition on the AuxiliaryTable to a join within the AF; and adjusting a list of columns projected from the AF to include any columns from the AuxiliaryTable that are required for a list of columns projected from the query.

Clause 13. The computer program of any of clauses 11-12 wherein changing the order of the join operation comprises;

keeping a join with the AuxiliaryTable as is in the query, joining the AuxiliaryTable with the AF table inside the ON clause of the AF, and copying the join condition along with any other condition on the AuxiliaryTable to the join within the AF.

Clause 14. The computer program of any of clauses 11-13 wherein the AF properties comprise:

"surplus", which specifies whether the AF can accept additional columns beyond columns specified in an AF input table (FuncTable) and a behavior of the AF over any accepted additional columns, "rowIndependence", which specifies whether the AF operates on each row independent of the others, and, for a single input row, that the AF produces zero output rows or one or more rows having the same values as a subset of the input row values, and "partitionIndependence", which specifies whether the AF operates on each partition independent of the others, and, for a single input partition, that the AF produces zero output rows or one or more rows having the same values as rows in a subset of the partitioning columns values of the input partition.

Clause 15. The computer program of any of clauses 11-14 wherein the query-level properties comprise:

"uniqueColJoin", which specifies whether the join operation between the AF table and the Auxiliary table involves a unique column in the Auxiliary table, and "projectionContainment", which specifies whether a projection list for the query (QProjList) is contained in a projection list for the AF (FprojList).

Clause 16. The computer program of any of clauses 11-15 wherein:

determining that the plurality of AF properties includes a plurality of AF properties includes determining that:
the AF will accept more columns in addition beyond columns specified in an AF input table and that those columns will be returned from the AF, and
the AF operates on each record independently of any other record, inferring query-level properties about the query includes:
determining that the join operation between the AF table and the AuxiliaryTable involves a unique column.

Clause 17. The computer program of any of clauses 11-16 wherein:

determining that the plurality of AF properties includes a plurality of AF properties includes determining that:
the AF will accept more columns in addition beyond columns specified in an AF input table and that those columns will be returned from the AF, and
the AF operates on each partition of a plurality of partitions independently of any other partition in the plurality of partitions, inferring query-level properties about the query includes:
determining that the join operation between the AF table and the AuxiliaryTable involves a unique column and that the unique column is a partitioning column.

Clause 18. The computer program of any of clauses 11-17 wherein:

determining that the plurality of AF properties includes a plurality of AF properties includes determining that:
the AF will accept more columns in addition beyond columns specified in an AF input table and that those columns will be returned from the AF, and
the AF operates on each record independently of any other record, inferring query-level properties about the query includes:
determining that the join operation between the AF table and the AuxiliaryTable does not involve a unique column.

Clause 19. The computer program of any of clauses 11-18 wherein:

determining that the plurality of AF properties includes a plurality of AF properties includes determining that:
the AF will ignore columns beyond columns specified in an AF input table, and
the AF operates on each record independently of any other record, inferring query-level properties about the query includes:
determining that the query projects some columns from the AuxiliaryTable column.

Clause 20. The computer program of any of clauses 11-19 wherein:

determining that the plurality of AF properties includes a plurality of AF properties includes determining that:
the AF will ignore any columns in addition beyond columns specified in an AF input table, and
the AF operates on each partition of a plurality of partitions independently of any other partition in the plurality of partitions, inferring query-level properties about the query includes:
determining that the join operation between the AF table and the AuxiliaryTable involves a unique column and that the unique column is a partitioning column.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for optimizing execution of a query invoking an analytical function (AF), wherein the query includes a join operation between an AF table and an AuxiliaryTable, the method comprising:

determining that the AF includes a plurality of AF properties, wherein the AF properties comprise:

"surplus", which specifies whether the AF can accept additional columns beyond columns specified in an AF input table (FuncTable) and a behavior of the AF over any accepted additional columns, "rowIndependence", which specifies whether the AF operates on each row independent of the others, and, for a single input row, that the AF produces zero output rows or one or more rows having the same values as a subset of the input row values, and "partitionindependence", which specifies whether the AF operates on each partition independent of the others, and, for a single input partition, that the AF produces zero output rows or one or more rows having the same values as rows in a subset of the partitioning columns values of the input partition;

inferring query-level properties about the query;

determining from the plurality of AF properties and query-level properties to change an order of the join operation.

2. The method of claim 1 wherein the join operation includes a first join with the AuxiliaryTable, wherein the first join includes first join conditions on the AuxiliaryTable, and wherein changing the order of the join operation comprises:

removing the first join with the AuxiliaryTable and the first join conditions from the query;

adding a second join between the AuxiliaryTable and the AF table inside an ON clause of the AF, the second join including the first join conditions; and adjusting a list of columns projected from the AF to include any columns from the AuxiliaryTable that are required for a list of columns projected from the query.

3. The method of claim 1 wherein the join operation includes a first join with the AuxiliaryTable, wherein the first join includes first join conditions on the AuxiliaryTable, and wherein changing the order of the join operation comprises;

keeping the first join with the AuxiliaryTable as is in the query, and adding a second join between the AuxiliaryTable and the AF table inside an ON clause of the AF, the second join including the first join conditions.

4. The method of claim 1 wherein the query-level properties comprise:

"uniqueColJoin", which specifies whether the join operation between the AF table and the Auxiliary table involves a unique column in the Auxiliary table, and "projectionContainment", which specifies whether a projection list for the query (QProjList) is contained in a projection list for the AF (FprojList).

5. The method of claim 1 wherein:

determining that the AF includes a plurality of AF properties includes determining that:

the AF will accept more columns in addition beyond columns specified in an AF input table and that those columns will be returned from the AF, and the AF operates on each record independently of any other record, inferring query-level properties about the query includes:

determining that the join operation between the AF table and the AuxiliaryTable involves a unique column.

6. The method of claim 1 wherein:

determining that the AF includes a plurality of AF properties includes determining that:

the AF will accept more columns in addition beyond columns specified in an AF input table and that those columns will be returned from the AF, and the AF operates on each partition of a plurality of partitions independently of any other partition in the plurality of partitions, inferring query-level properties about the query includes:

determining that the join operation between the AF table and the AuxiliaryTable involves a unique column and that the unique column is a partitioning column.

7. The method of claim 1 wherein:

determining that the AF includes a plurality of AF properties includes determining that:

the AF will accept more columns in addition beyond columns specified in an AF input table and that those columns will be returned from the AF, and the AF operates on each record independently of any other record, inferring query-level properties about the query includes:

determining that the join operation between the AF table and the AuxiliaryTable does not involve a unique column.

8. The method of claim 1 wherein: determining that the AF includes a plurality of AF properties includes determining that:

the AF will ignore columns beyond columns specified in an AF input table, and the AF operates on each record independently of any other record, Inferring query-level properties about the query includes:

determining that the query projects some columns from the AuxiliaryTable column.

9. The method of claim 1 wherein:

determining that the AF includes a plurality of AF properties includes determining that:

the AF will ignore any columns in addition beyond columns specified in an AF input table, and the AF operates on each partition of a plurality of partitions independently of any other partition in the plurality of partitions, inferring query-level properties about the query includes:

determining that the join operation between the AF table and the AuxiliaryTable involves a unique column and that the unique column is a partitioning column.

10. A non-transitory computer-readable tangible medium, on which is recorded a computer program, the computer program comprising executable instructions, that, when executed, perform a method comprising:

determining that the AF includes a plurality of AF properties, wherein the AF properties comprise:

"surplus", which specifies whether the AF can accept additional columns beyond columns specified in an AF input table (FuncTable) and a behavior of the AF over any accepted additional columns, "rowindependence", which specifies whether the AF operates on each row independent of the others, and, for a single input row, that the AF produces zero output rows or one or more rows having the same values as a subset of the input row values, and "partitionIndependence", which specifies whether the AF operates on each partition independent of the others, and, for a single input partition, that the AF produces zero output rows or one or more rows having the same values as rows in a subset of the partitioning columns values of the input partition;

inferring query-level properties about the query:

determining from the plurality of AF properties and query-level properties to change an order of the join operation.

11. The computer program of claim 10 wherein the join operation includes a first join with the AuxiliaryTable, wherein the first join includes first join conditions on the AuxiliaryTable, and wherein changing the order of the join operation comprises:

removing the first join with the AuxiliaryTable and the first join conditions from the query;

adding a second join between the AuxiliaryTable and the AF table inside an ON clause of the AF, the second join including the first join conditions; and adjusting a list of columns projected from the AF to include any columns from the AuxiliaryTable that are required for a list of columns projected from the query.

12. The computer program of claim 10 wherein the join operation includes a first join with the AuxiliaryTable, wherein the first join includes first join conditions on the AuxiliaryTable, and wherein changing the order of the join operation comprises;
   keeping the first join with the AuxiliaryTable as is in the query, and
   adding a second join between the AuxiliaryTable and the AF table inside an ON clause of the AF, the second join including the first join conditions.

13. The computer program of claim 10 wherein the query-level properties comprise:
   "uniqueColJoin", which specifies whether the join operation between the AF table and the Auxiliary table involves a unique column in the Auxiliary table, and
   "projection Containment", which specifies whether a projection list for the query (QProjList) is contained in a projection list for the AF (FprojList).

14. The computer program of claim 10 wherein:
   determining that the AF includes a plurality of AF properties includes determining that:
      the AF will accept more columns in addition beyond columns specified in an AF input table and that those columns will be returned from the AF, and
      the AF operates on each record independently of any other record, inferring query-level properties about the query includes:
         determining that the join operation between the AF table and the AuxiliaryTable involves a unique column.

15. The computer program of claim 10 wherein:
   determining that the AF includes a plurality of AF properties includes determining that:
   the AF will accept more columns in addition beyond columns specified in an AF input table and that those columns will be returned from the AF, and
   the AF operates on each partition of a plurality of partitions independently of any other partition in the plurality of partitions, inferring query-level properties about the query includes:
      determining that the join operation between the AF table and the AuxiliaryTable involves a unique column and that the unique column is a partitioning column.

16. The computer program of claim 10 wherein:
   determining that the AF includes a plurality of AF properties includes determining that:
      the AF will accept more columns in addition beyond columns specified in an AF input table and that those columns will be returned from the AF, and
      the AF operates on each record independently of any other record, inferring query-level properties about the query includes:
      determining that the join operation between the AF table and the AuxiliaryTable does not involve a unique column.

17. The computer program of claim 10 wherein:
   determining that the AF includes a plurality of AF properties includes determining that:
      the AF will ignore columns beyond columns specified in an AF input table, and
      the AF operates on each record independently of any other record, Inferring query-level properties about the query includes:
      determining that the query projects some columns from the AuxiliaryTable column.

18. The computer program of claim 10 wherein:
   determining that the AF includes a plurality of AF properties includes determining that:
      the AF will ignore any columns in addition beyond columns specified in an AF input table, and
      the AF operates on each partition of a plurality of partitions independently of any other partition in the plurality of partitions,
   inferring query-level properties about the query includes:
      determining that the join operation between the AF table and the AuxiliaryTable involves a unique column and that the unique column is a partitioning column.

* * * * *